United States Patent [19]

Sarofeen

[11] 3,938,775
[45] Feb. 17, 1976

[54] MOLD ASSEMBLY FOR CASTING SYNTHETIC LENSES

[76] Inventor: George M. J. Sarofeen, 107 Hanover Ave., Colonial Heights, Va. 23834

[22] Filed: Aug. 20, 1973

[21] Appl. No.: 390,060

[52] U.S. Cl. .................. 249/102; 249/160; 264/1; 264/26; 425/808
[51] Int. Cl.² ........................................ B29D 11/00
[58] Field of Search ................ 425/808; 264/1, 26; 249/102, 120, 126, 127, 155, 160

[56] References Cited
UNITED STATES PATENTS

| | | | |
|---|---|---|---|
| 1,767,163 | 6/1930 | Ackermann | 249/102 |
| 2,333,051 | 10/1943 | Smith | 425/808 |
| 3,273,204 | 9/1966 | Craddock | 425/808 |
| 3,555,611 | 1/1971 | Reiterman | 425/808 X |
| 3,605,195 | 9/1971 | Campbell | 425/808 |
| 3,806,079 | 4/1974 | Beattie | 425/808 |
| 3,836,111 | 9/1974 | Binder | 425/808 X |

*Primary Examiner*—Roy Lake
*Assistant Examiner*—Neil Abrams
*Attorney, Agent, or Firm*—Cameron, Kerkam, Sutton, Stowell & Stowell

[57] ABSTRACT

A method of making mold assemblies in which are cast polymerized synthetic resin, single vision and multi-focal plastic ophthalmic lenses. Molds are used to produce optical surfaces on the cast resin lenses. These are of glass which is optically surfaced and then assembled within a resilient carrier and supported frictionally in sealed engagement with the tubular resilient walls of the mold assembly carrier. The carrier is designed to provide for positioning the mold elements dimensionally so as to control concentricity, thickness and prism of the finished casting with no portion of the body of the carrier interlying the glass mold elements. Unrestricted shrinkage therefore is allowed to take place in thickness so as to allow full curing of the lens without premature mold separation. The mold assembly is sealed to provide a hermetic closure against leakage of contents or intrusion of air into the mold assembly during curing.

12 Claims, 20 Drawing Figures

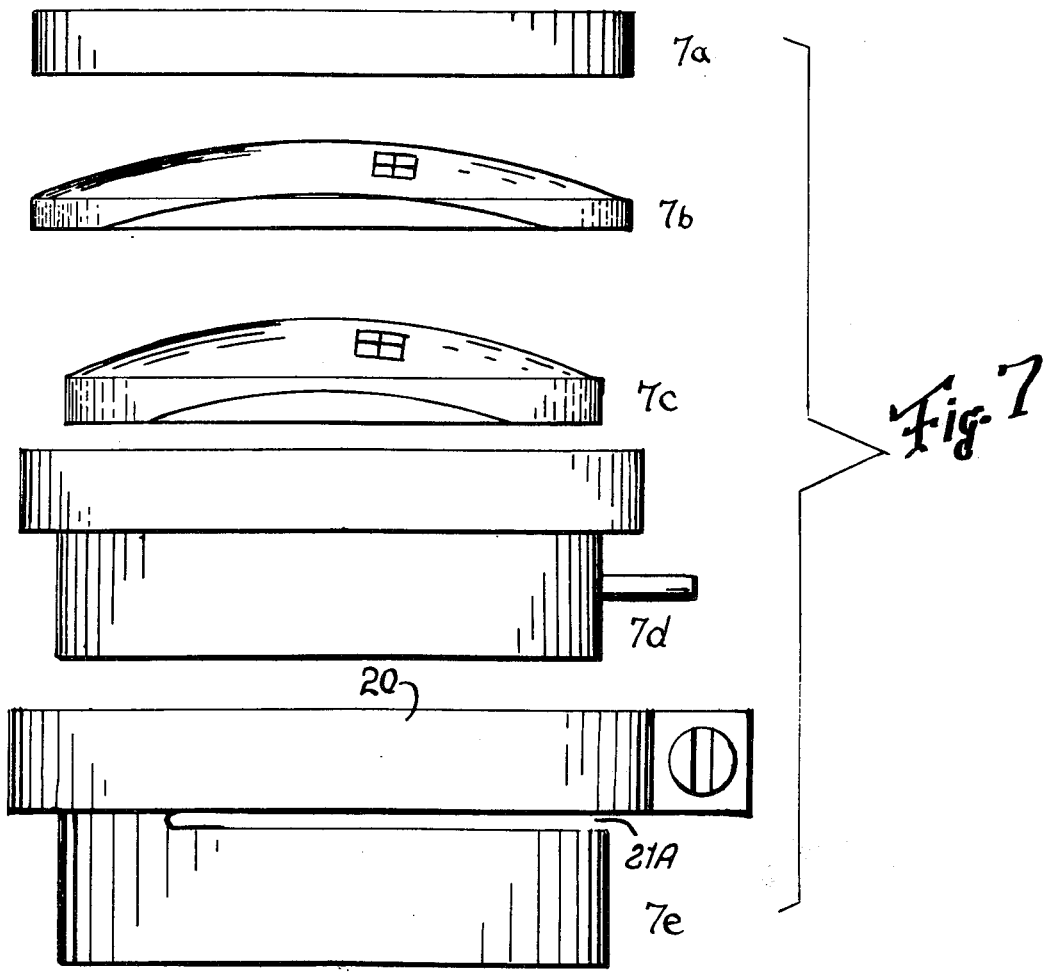
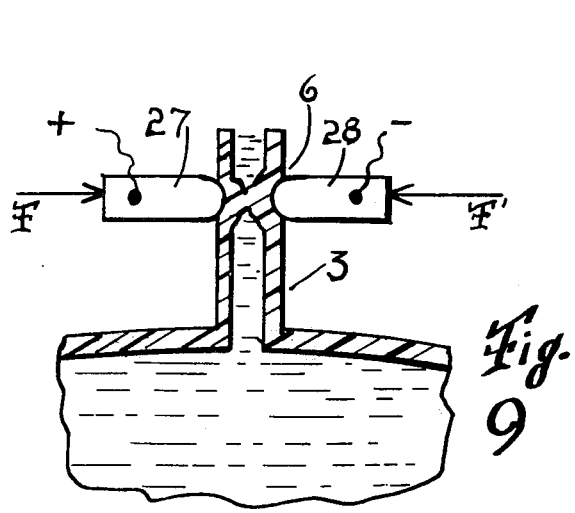
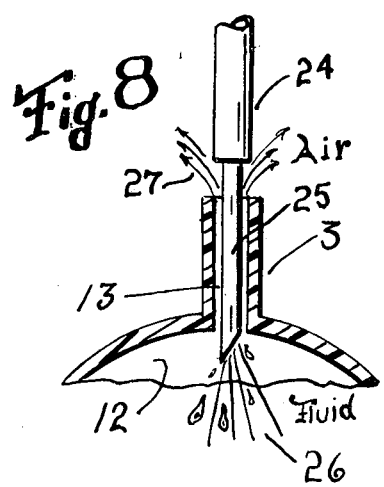

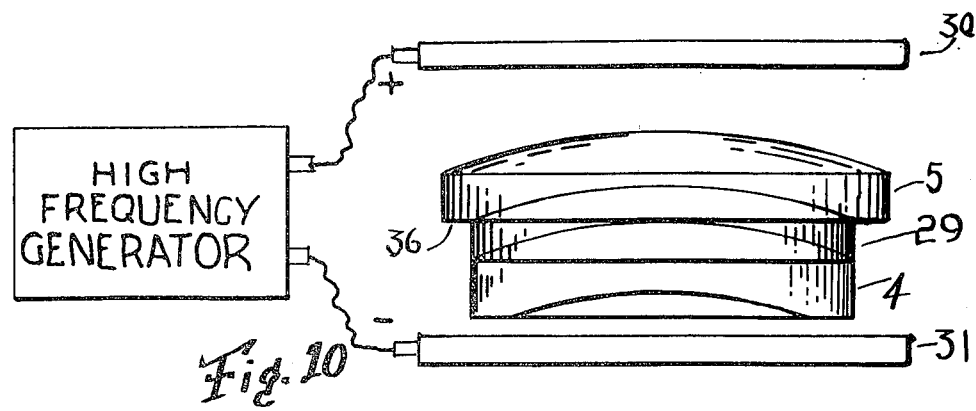
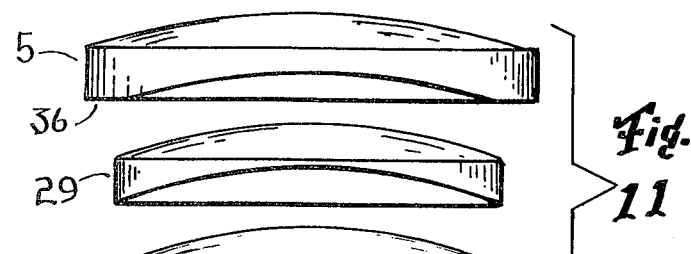
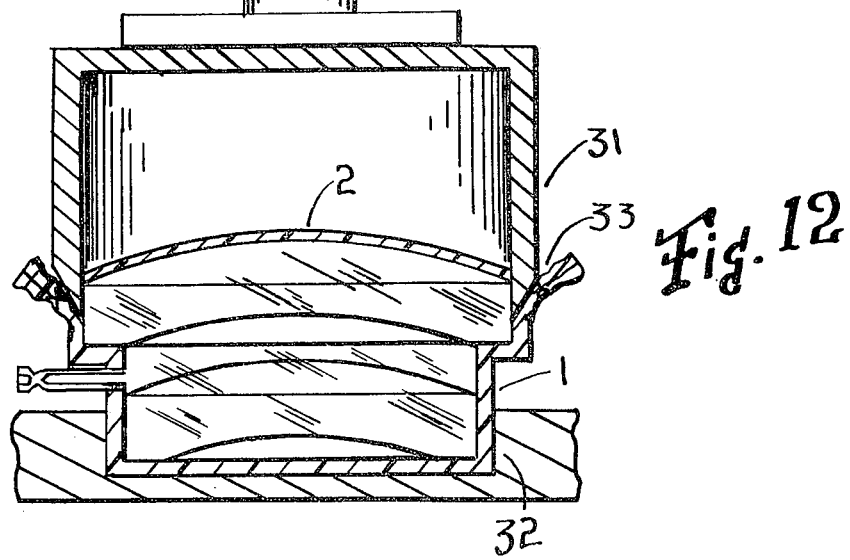

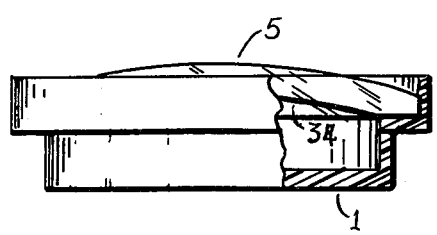
Fig. 13
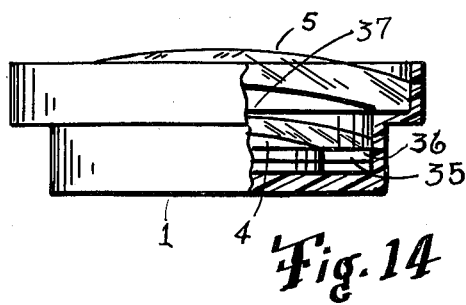
Fig. 14
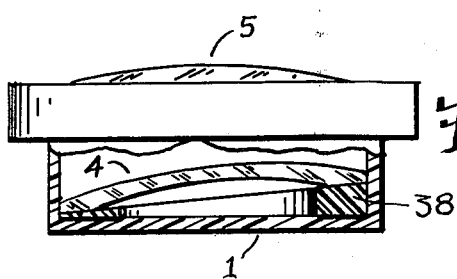
Fig. 15
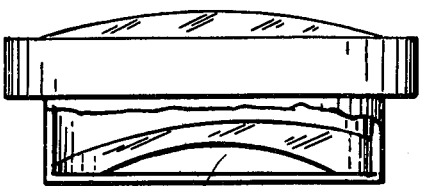
Fig. 16
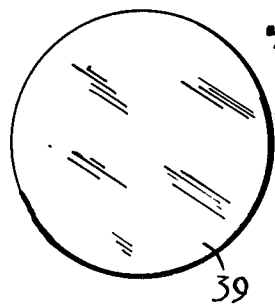
Fig. 17
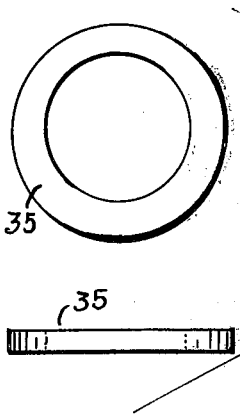
Fig. 18
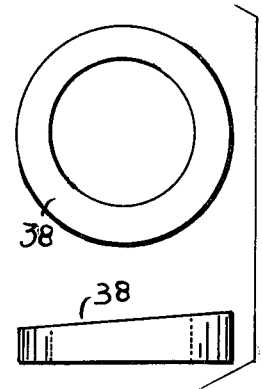
Fig. 19

MOLD ASSEMBLY FOR CASTING SYNTHETIC LENSES

FIELD OF THE INVENTION

This invention relates generally to casting single vision and multi-focal synthetic resin polymerized plastic lenses, both spherical and toric, with finished optics on one or both sides.

DESCRIPTION OF THE PRIOR ART

Plastic lenses are cast according to the present art between a pair of glass mold pieces, at least one of which has an optically finished surface prepared to the optical configuration desired to be made on a finished surface of the cast plastic lens. The other mold piece of the pair may be of precisely the curvature and characteristics corresponding to that desired of an opposite side of the lens to be cast, or may be of random configuration which surface is later ground and polished to the desired prescribed optical surface.

In order to cast such a lens from the liquid monomers, of which such lenses are polymerized, it is necessary to mount the mold faces in an annular resilient gasket which is recessed so as to position the mold faces concentrically in seats and is made with a gasket rib extending inwardly all around the inside of the gasket body a short distance to interlie the molds and thereby establish the desired sealed cavity in which to cast a lens and also to establish the thickness and parallelism of the lens.

A plastic lens intended to be cast as a toric lens will necessarily have edges of unequal thickness at different points about the periphery. This requires a thickness control rib of specified thickness corresponding to the variables desired in the edge thickness of the cast lens.

It is well known in the art of casting plastic lenses that a lens having large differences in thickness from center to edge, or large variations in thickness at different points about the periphery will be very troublesome to cure. In cases where such thickness variations exceed a certain minimum amount, the gasket must be removed entirely when the lens has been partially cured in order to allow the lens to shrink without further resistance due to compression of the gasket rib. This is done after gelling but before hardening, so as to allow the cure to be completed without causing premature separation of the lens and molds due to back pressure from the overly compressed annular gasket thickness control rib.

Extremely high internal strains are created within a lens during the final cure period. These occur after gelling and solidification of the monomers and while approaching final polymerization and cure. During this period, the partially polymerized monomers form a tenacious adhesive bond to the glass mold face. This bond can exceed the internal tensile strength of the body of the glass. There is an undesirable possibility during these final stages of cure when shrinkage due to polymerization causes the lens faces to separate from the mold faces. When this occurs, air is drawn into the mold assembly. Air acts as an inhibitor to polymerization and inhibits further curing of the surfaces. This causes a soft lens to be made, and optical aberrations may also occur in the surface of the lens due to this same premature opening of the mold assembly.

The separation of lens from the mold bodies results from the build-up of back pressure which results from the increasing resistance to compression which builds up in the thickness control rib of the gasket due to shrinkage of the lens casting during polymerization and cure. This reduction in thickness in the rib is as much as 14%. In the case of toric lenses, the lens edge thickness can differ as much as ten to one when measured on ninety degree meridians. It can be seen that 14% shrinkage at the thickest point on the edge may be easily accomodated to at that point by compression of the relatively thick section of the gasket rib, but it may be impossible for the thin portion of the gasket rib to compress an equal distance without creating back pressures of a very high order due to resistance to such massive proportional compression in its thickness.

In cases where the lens and mold are forced apart due to massive resistance to compression at the thinner section of the gasket rib, and where the lens retains its bond to the glass surface of the mold, a catastrophic rupture can occur in a portion of the mold face whereby there may be pulled out bodily from the glass mold surface a substantial chunk of glass.

The monomers and monomer mixtures used may be as described in my U.S. Pat. No. 2,964,501 wherein I disclose many combinations of co-polymers and temperature sequences suitable for making synthetic resin lenses with the methods and style of molds which are the subject of my present invention. A very acceptable lens may be cast using a single monomer, namely, diethylene glycol bis (allyl) carbonate, which forms a hard cross linked polymer when cured. This monomer is best catalyzed with from 3% to 5% by weight of isopropyl percarbonate. The monomer is usually placed in a non reactive container such as one of stainless steel, glass or polyethylene and a slow speed stirrer provided to agitate the mix. The catalyst is then added to the monomer and mixed until thoroughly dissolved.

Amongst the features which make the above monomer desirable are that the polymer is insoluble in the monomer, that the vapor pressure is relatively low below the boiling point, that there is a gradual and uniform gelling and hardening during polymerization. Such monomers as referred to in my former U.S. Pat. No. 2,964,501 and as described above are desirable as lens casting agents in the application of the prior art of casting lenses. There are serious limitations in the prior art methods, the mold assemblies allow leakage of the monomer while liquid and in the first stages of heating when expansion occurs. Furthermore, there are certain unpredictable contingencies which occur, for example if gelling begins to take place from the center of the monomer mass and then moves outwardly it can be seen that shrinkage occurs overall and air is drawn into the mold through the liquid which lies adjacent the inadequate pressure seal which is common today, spoiling the casting due to the intrusion of air which as stated has an inhibiting effect on the polymerization process as described above.

The combination of the above shortcomings of the prior art result in the existence of a very unpredictable process. Quality and quantity yields vary from batch to batch. This serious set of limitations makes it necessary, in order to maintain a reasonable percentage level of quality yields, to run different types of lenses under different curing heat cycles. Mold assemblies in some cases must be disassembled early to prevent premature opening and the soft lenses then removed from the molds and cured further to questionable hardness in vacuum chambers. In other cases the mold assemblies are removed from the curing ovens, the gaskets removed and then are put back into the curing ovens to allow final shrinkage to take place. Such a procedure results in soft peripheries on the lenses for the edges do not fully polymerize once they have been exposed to air.

These methods of the present art are tedious, clumsy and costly to implement. They result in waste due to the fact that lenses removed while partially cured are extremely sensitive to receiving fingerprints, scratches and other damage during handling. Furthermore, once air has contacted the exposed lens surface or edges it inhibits that area from becoming fully polymerized and cured regardless of the care which may be taken to attempt to finish the curing cycle thereafter.

In addition to the above drawbacks, a lens which has become exposed to air will change color to an undesirable yellow tint which is not acceptable to the trade.

For these reasons, plus the additional reason of the possibility of suffering great economic losses due to these unpredictable drawbacks, there is an urgent need in the field of this invention for reliable systematic methods of casting ophthalmic lenses so that greater precision, speed, economy and reliability of quality yield can be realized without reliance on the skill of the hand operator in removing and curing soft lenses.

SUMMARY OF THE INVENTION

The basic prerequisite of the present process is a resilient mold assembly support member which is designed without an inner thickness control rib interlying the mold faces. This is to insure that no mass of material interlies the mold faces to bar freedom of movement of the opposed elements, one toward the other, as the lens shrinks. Provision is made in the mold assembly support member to seat the mold elements in spaced annular seats of different diameter, and spaced apart at a given distance axially. The mold elements are appropriately sized so as to fit tightly inside the walls of the resilient mold assembly support at their edge periphery when seated in the mold assembly support member. The mold face elements are made in different diameters with the lower mold element, which forms the concave side of the lens, made of a smaller diameter than the upper mold face element. The lower mold element is seated for thickness reference in a lower, smaller diameter annular seat of the mold assembly support member. The wall of the support member is made of a small enough diameter so as to snugly cling to the periphery of the lower mold when stretched. This creates a seal at the mold's outer edge periphery due to resilience provided for in the elastic composition of the material of the walls of the support member. The lower mold element is also seated with its underside against a shelf formed by an annular wall extension at its lower end. This shelf extends inwardly under the lower mold element at right angles and forms a flat seat area of reference and positioning. The lower mold element thus bottoms on an annular shelf at the lower end of the mold assembly support member. Thickness and parallelism are controlled by virtue of the depth of the outer dimension wall which connects at right angles to the bottom shelf and extends peripherally between the lower annular shelf to the upper annular shelf wherein the mold for forming the upper surface is supported. This outer wall is relatively thin and may contract rather easily but has high resistance to elongation and thereby controls the thickness dimension determination while the mold assembly is being put together. It also has the characteristic of giving way in compression very easily to allow contraction during curing to allow free shrinkage and freedom of movement of the mold faces one toward the other.

The mold assembly is put together with both mold elements spaced axially and securely seated in position on the upper and lower annular shelves of the mold assembly carrier. A cavity thus formed has its boundary defined by the walls of the mold assembly support member and the mold faces within the mold assembly. The cavity is then filled with monomers through a tube provided in the annular dimension wall. After filling, the needle is withdrawn and any overfill is allowed to bleed out of the tube whereupon the tube is sealed by heat fusion by a suitable device. An additional step which further guarantees hermetic sealing is accomplished by providing an upper cover element which lies over the top of the upper mold element and which is heat fused all around to an extension of the upper wall of the mold support assembly. Hermetic sealing provides a safeguard against leakage of the monomer from the mold assembly and further provides positive prevention of entry to within the mold assembly, of air or water or other contaminants which would inhibit proper lens polymerization and curing.

This assembly is then cured in air ovens or while totally immersed in a liquid medium such as water for maximum curing speed and uniformity of characteristics of the cast lenses.

DESCRIPTION OF THE DRAWINGS

FIG. 7. Is an exploded view showing a plurality of mold elements.

FIG. 8. Is a sketch which is partially broken to show mold filling action.

FIG. 9. Is a sketch, partly broken away, to illustrate a sealing method of the filler tube.

FIG. 10. Shows an elevation view of a mold separation method.

FIG. 11. Shows molds and lens after separation.

FIG. 12. Shows a cutting device for stripping mold assembly support members.

FIG. 13. Is an elevation view, partly broken away, of a semifinished lens making mold assembly.

FIG. 14. Is a view of elevation, partly broken away, to show the use of spacer rings.

FIG. 15. Is a view of elevation, partially broken away, to show the use of prism spacer rings.

FIG. 16. Is a view in elevation, partly broken away, to show the use of a prismatic lower mold element.

FIG. 17. Is a plan and end view of a prismatic lower mold element.

FIG. 18. Is a plan and end view of a spacer ring.

FIG. 19. Is a plan and end view of a wedge type spacer ring.

DESCRIPTION OF THE PREFERRED EMBODIMENTS

Figure 1:
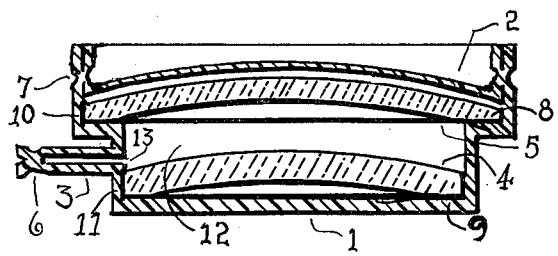
FIG. 1. Illustrates a complete mold assembly, in plan view, ready for curing.

The basic prerequisite for the present process is a resilient mold assembly support member. This is made in the form of an irregular cylinder with an upper shelf and a lower shelf between which a wall extends a given distance to control lens thickness and parallelism. A sealing cap is provided and heat sealed to the upper sealing wall, if desired, to hermetically seal the unit.

To cast a lens it is necessary to make a lower mold element out of glass, with a first optically correct convex surface, and on the concave side having a flattened seating portion extending inwardly at right angles from the periphery of the lower mold element for about ¼ inch all around. The lower mold element is sized so that as it is pressed downwardly into the mold assembly support with the flattened rim of the concave side down, it acts to stretch the lower wall to provide a tight seal around its edge until eventually its flat seat area comes to rest against the bottom mold shelf from which dimensional reference can be had to control lens thickness and parallelism.

The upper mold element is made with the optically correct surface on the concave side with a flattened portion about the periphery of the concave side, thus both upper and lower molds are provided with flat seats on the concave sides. The upper mold element is sized so that when it is pressed into the mold support assembly, concave side down, it stretches the annular upper sealing wall to provide a tight seal about its edge periphery until it comes to rest with its flattened seat against the upper annular mold shelf from which reference may be had relatively of the bottom shelf to determine the thickness and parallelism of the dimension wall which connects upper and lower shelves, and other techniques described further herein. As should be apparent to effect proper sealing, the inner diameter of the walls of the mold support elements must be slightly less than the diameter of the associated mold elements.

The mold assembly as stated earlier is then filled with a catalyzed liquid monomer by way of a hollow needle which is inserted through the filling tube which is provided at one point in the dimension wall. When full, the needle is withdrawn and any superfluous monomer is drained away whereupon the filler tube is heat sealed. Then the upper end of the mold assembly may be capped with the upper cover member, a sealing disc of resilient material, which can be heat sealed to the annular extension of the upper sealing wall to provide a more positively hermetically sealed mold assembly.

The optical properties of the lens to be cast are determined by the configuration of the inner opposed faces of the mold elements against which the lens is cast. The thickness or degree of parallelism is controlled by the depth of the lower dimension wall of the mold support assembly and the thickness or wedge dimensions of the lower mold element plus any thickness adjustment disc or washers which can be placed on the lower annular shelf under the lower mold element to adjust the depth of the lens casting cavity. The lower mold element may also be made wedge-like to cause its upper surface to lie at an angle relatively of the upper mold face. This forms a wedge-like cavity wherein a lens having a prismatic refractive characteristic may be cast. The degree of prism power is determined by the amount of wedge induced in the lower lens mold element or in thickness adjustment discs or washers placed on the lower annular shelf to provide an annular seat on which the lower mold element is made to lie. In addition to this, it can readily be seen that the lens is cast to a thickness which is governed also by the thickness of the lower mold element. Lenses of different thickness and prism may be cast in mold support elements having a uniform depth of dimension wall by varying the thickness and/or wedge of the lower mold element, or of thickness discs and washers underlying the lower mold element.

The upper surface of the lower mold element may be made in toric or sphero-cylindrical form against which lenses of toric form may be cast. Thus, by varying the thickness, the wedge, the curve or curve combinations of the lower mold element, and the curves or combination of curves which are ground into the lower face of the upper mold element, many myriad lens combinations may be cast to produce a finished or semi-finished lens blank of varied optical characteristics. Bifocal lenses can readily be cast by making and using molds according to the techniques taught by R. E. Casko in U.S. Pat. No. 3,460,928 and in other similar patents.

REFERRING TO THE DRAWINGS

Figure 3:
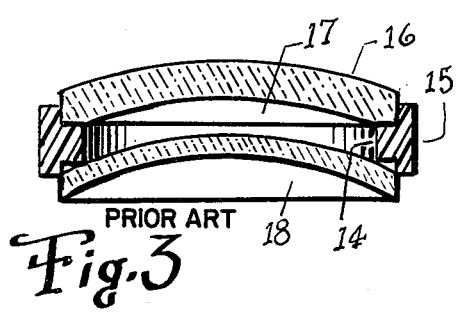
FIG. 3. Illustrates a cross section of a complete mold assembly according to the prior art, taken on line B–B' of FIG. 4.
Figure 4:
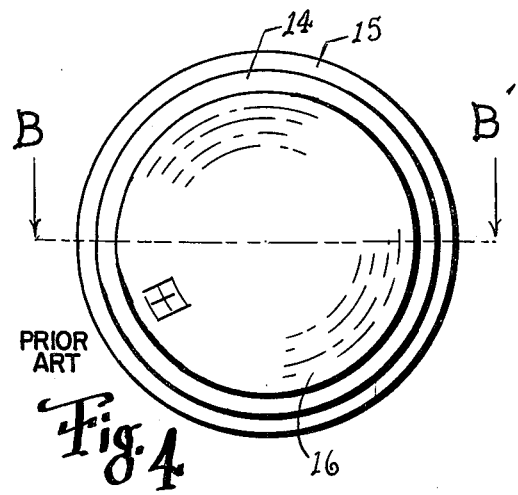
FIG. 4. Is a plan view of a mold assembly of the prior art.

My present invention is further described with reference to the drawings wherein I show in FIGS. 1 and 2, a mold assembly which has been filled and is ready to be inserted into a heating apparatus for curing. The assembly is composed of the mold assembly support member 1 with the sealing cap 2, shown in place with a filler tube 3 shown as an integral part of the mold assembly support member 1. Mold elements 4 and 5 are shown in place within the mold assembly support member and a heat fusion is illustrated at 6 on the filler tube and at 7 on the sealing cap periphery to cause the assembly to be hermetically sealed. The flattened seating portions 8 and 9 of the mold elements 5 and 4 lie in contact with complementary annular seats in the wall of the mold assembly support member. A tension type seal is formed at annular contact areas 10 and 11 to further confine the liquid monomers to the lens casting cavity area 12 leaving only the entry port 13 in the filler tube 3 whereby monomeric liquids may be entered. By way of comparison and to further teach my method over that of the prior art, I show in FIGS. 3 and 4 an illustration of a mold assembly according to the prior art. Particular attention is directed to the massive rib 14 of gasket 15 wherein upper mold element 16 is supported and overlies the lens casting cavity 17, the lower portion of which cavity 17 is formed by the lower mold element 18. The massive rib 14 has been completely removed from between the mold elements in my present invention to eliminate resistance to shrinkage and consequent leakage and premature mold separation.

Figure 5:
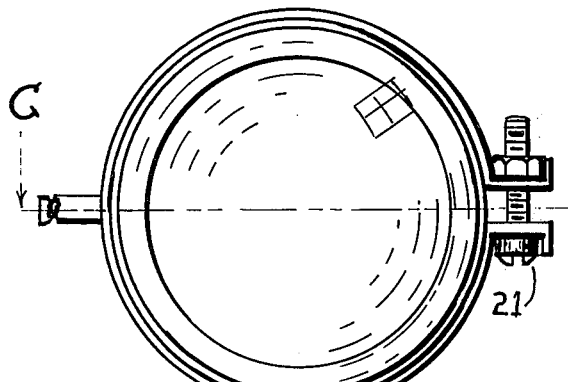
FIG. 5. Illustrates, in plan view, a mold assembly of my present invention shown in a cradle.
Figure 6:
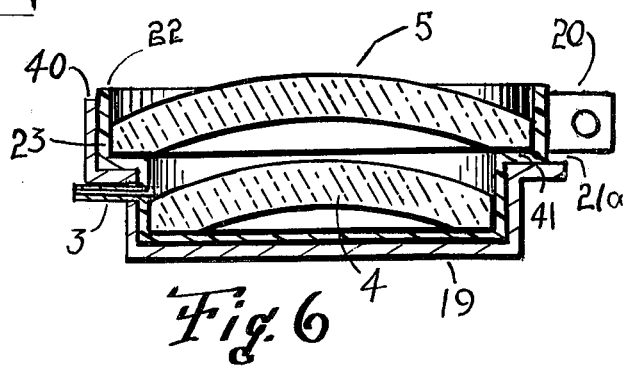
FIG. 6. Is a cross section taken on line C–C' of FIG. 5.

In FIGS. 5 and 6, I illustrate a mold assembly which includes the addition of a stiffening cradle 19 which is designed to receive a mold assembly support member to provide for greater stability in making certain lens castings where great accuracy of relative positioning of the mold elements 4 and 5 is required. The cradle 19 may be made of highly heat resistant plastics such as phenolics and polycarbonates but is preferably made of a good heat conducting metal such as copper or its alloys or aluminum. The cradle 19 is generally shaped to the outer contour of the mold assembly support member 1 so as to receive it snugly and to provide close support. A clamping ring 20 which can be constricted by clamping screw 21 is formed integrally with the body of the cradle 19 wherein a slot 21a is cut to allow a portion of the clamping ring to move for a portion of its length peripherally so as to allow it to constrict inwardly against the upper wall 22 of the mold assembly support member 1 to form a pressure hermetic seal at 23 with the outer edge periphery of the upper mold member 5. In this configuration a seal is accomplished which eliminates the need for use of a sealing cap 2.

In FIG. 7, I have shown an exploded view of all the elements which go into both last previously described assembly options. I will also now describe a third assembly option. The third assembly option which is illustrated in FIG. 13 is used for casting semi-finished rough blanks where only one side of the lens casting needs to be to optical standards.

The three assembly options; Option No. 1 requires the use of the elements of FIG. 7 as follows: elements 7a, 7b, 7c, and 7d. These elements when put together according to the manner of FIG. 2, provide an assembly which is sealed and ready to be advanced to curing.

Option No. 2, the assembly illustrated in FIGS. 5 and 6 requires the use of elements of FIG. 7 7b, 7c, 7d, and 7e, such an assembly is used where great accuracy is required and need not be heat fusion sealed at the sealing cap.

Option No. 3, as illustrated in FIG. 13, is designed to produce only semi-finished lenses and may be assembled using elements of FIG. 7 as follows: 7b, 7d, and 7e in combination or 7a, 7b, and 7d, as may best suit the requirements at any given time.

In order to demonstrate the manner in which the liquid monomers are introduced into the lens casting cavity 12, a simulated partial cutaway is shown, by way of illustration in FIG. 8, wherein a tube 24 which carries monomer mixtures under pressure has at its terminus a needle 25 which is shown within part 13 of tube 3. This illustration is made to show the liquids entering under pressure while the displaced air escapes at 27 between the needle 25 and the inner walls of filler tube 3.

When the lens casting cavity 12 has been filled, it is then heat fusion sealed as illustrated in a partially broken away simulation sketch in FIG. 9. Electrodes 27 and 28 shown as compressing the filler tube 3 at 6 by virtue of forces F and F1 delivered by suitable arrangement within a conventional press and energized by a conventional electronic high frequency sealing generator connected to the electrodes 27 and 28 by suitable means and as represented in FIG. 9 by the symbols + and −.

In FIG. 10, I have illustrated the mold elements 4 and 5 and the finished cast lens 29 as they appear after curing. At this time the three pieces 4, 5 and 29, as shown are firmly adhered, surface to surface and must be separated in such a manner as to avoid the undue application of mechanical force which may damage the lens or mold elements. The first step after curing, according to my invention, to separate the finished lens casting safely and so as to avoid damage to the molds or the lens casting, is to place the finished mold assembly support member, after removal from the curing medium, and after removal of the cradle therefrom, into a press arrangement as shown by way of illustration in FIG. 12. A conventional press ram 30 is fitted with circular cutter 31 and aligned with a positioning recess 32 wherein a finished cured mold assembly is situated for cutting. As the ram 30 decends it cuts the hermetically sealed mold assembly support member 1 at the annular contact area 33. Once the cut has been made, the press is reversed so as to retract cutter 31, and the mold assembly then is divested manually of the mold assembly support member lower portion 1 and the sealing cap 2. The remainder of the assembly consisting of the upper and lower mold elements 4 and 5 and the finished lens 29 are advanced to a conventional high frequency electronic generator having electrodes 30 and 31 as shown in FIG. 10, of a surface area adequate to induce internal heating within the finished lens blank 29. High frequency energy is then caused to be applied to the assembly for such length of time as is required to break the adhesive bond between the mold elements 4 and 5 and the lens casting 29, due to internal heating within the finished lens casting 29.

In FIG. 13, I have shown an illustration of an Option No. 3 type of assembly for casting semi-finished lenses. It will be seen that the upper mold element 5, and the mold assembly support member 1, are all that are needed to complete this optional arrangement. The optical surface produced on the semi-finished lens casting in contact with the underside 34 of the upper mold element 5 becomes the only optical surface on the finished lens. The remaining surfaces are of the same texture as of the inner walls of the mold assembly support member 1.

In FIG. 14, I have shown how lenses of different desired center or edge thicknesses can be made within a mold assembly support member of a given dimension. Spacer rings 35, as detailed in FIG. 18, are introduced under the flattened area 36 of the lower mold element 4 to adjust the apex 37 of the lower mold element relatively of the upper mold element 5 for the purpose of controlling the thickness of the finished cast lens.

In FIG. 15, I have shown an arrangement whereby prism can be cast into the finished lens by introducing a wedge shaped spacer ring 38, as detailed in FIG. 19, under the lower mold element 4 to cause it to lie at an angle with relation to upper mold element 5 so as to produce a wedge shaped lens casting which will operate to create a prismatic optical component within the finished lens casting.

In FIG. 16, I have shown an alternate method of producing prism lenses through the use of a wedge shaped lower mold element 39, as detailed in FIG. 17.

Figure 20:
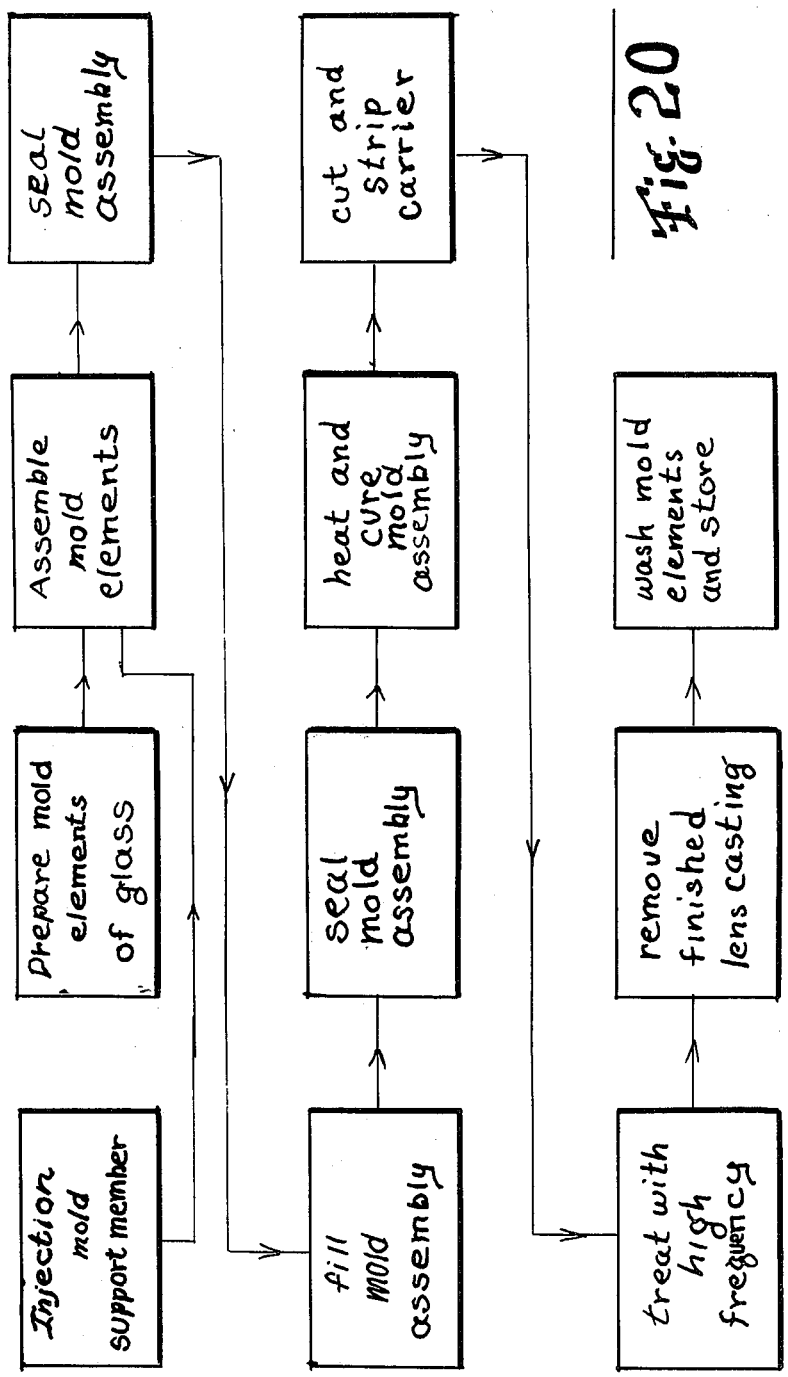
FIG. 20. Is a work flow diagram illustrating my manufacturing method.

In FIG. 20, I have shown a lens casting method using my invention which outlines the steps involved in producing finished lens castings.

My lens mold elements are produced in the conventional manner with conventional optical surfacing equipment and are stored ready for use in the mold storage area.

The first step in my process is the molding by injection molding techniques or other suitable techniques, of the mold assembly support member 1 and the support member cap 2. These are preferably made of polyethylene or a polyvinyl chloride formulation which is plasticized to a hardness of between 60 to 90 durometer. Mold elements are inserted into position within the mold carrier support member, heat sealed or clamped, as the case may be, and then advanced to an air oven or a liquid bath on continuous conveyors to effect the cure. After curing, the next step is the removal of the mold assembly carrier, then subjecting the adhered mold elements and lens to electronic or ultrasonic high frequency to weaken or separate the adhesive bond between the finished lens and the mold element. Finally the finished lens casting is inspected, graded and packed and the mold elements returned to washing and storage for reuse in the future.

In order to further describe the method of my invention as applied to the art of casting lenses I will outline the steps which I used in preparation of the mold assemblies in order to produce different types of lenses, i.e., single vision, bifocal, plus power, minus power and sphero-cylinder or toric types, in accordance with my invention.

I first prepared a series of mold elements with optically ground and polished surfaces of assorted radii. In the case of those mold elements which were ground and polished on the concave side, I ground an annular flat seat area 36 inwardly of the edge and contiguous to the ground and polished area. The peripheral edges I finished to a surface texture which was smoothed enough to form a hermetic seal with contact under tension against the undersized resilient wall member 40 of the mold assembly support member when in contact with the edge of the mold under the degree of pressure supplied by the natural resilience of the upper sealing wall 22. On those mold elements which were ground and polished on the convex side, I supplied the annular flat seat 36a, on the concave side as shown in FIG. 11.

Figure 2:
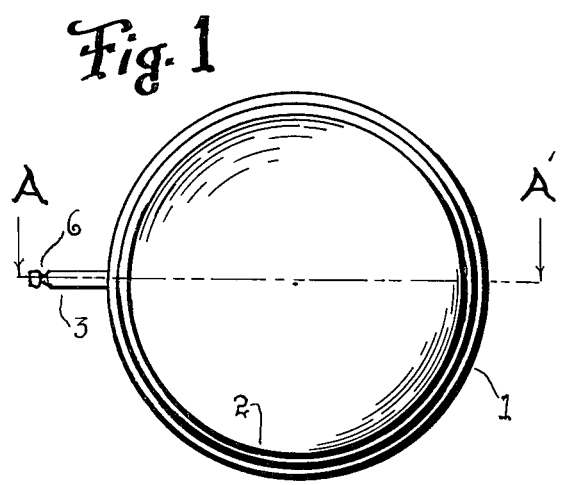
FIG. 2. Is a cross section taken on line A–A' of FIG. 1.

In order to cast a lens of little or no power, i.e., a plano lens, I first chose a convex surfaced mold element such as shown in FIG. 2. I placed this within the mold assembly support member 1 and pressed it down firmly against the resistance of the lower dimension wall so that the annular seat 36 came firmly in contact with the lower annular shelf 9. I then chose a mold element 5 having the concave side surfaced optically to substantially the same radius of curvature as the lower mold element but having a larger diameter than the lower mold element 4. I pressed this firmly down against the resistance of the upper sealing wall 22 until it became firmly seated with the annular seat 8 firmly seated against the upper shelf 41 of the mold support member. I heat sealed the sealing cap 2 in position as shown in FIG. 2 and introduced the needle 25 through the filler tube 3 through which I inserted a catalyzed liquid monomer under pressure and which was prepared as described previously until the lens casting cavity 12 was completely filled. I removed the needle 25 and allowed the surplus monomer to drain away and advanced the mold assembly to the heat sealing press where I sealed the filler tube 3 at 6 as shown in FIG. 9.

I then suspended the total mold assembly from a support 42 into a heat controlled liquid bath 43 as shown in FIG. 20 for curing. I maintained the heated baths at a temperature of 130°F for a period of 8 hours. I then removed the mold assembly from the heated bath and allowed it to cool to room temperature. I then cut away the outer envelope 1, as shown in FIG. 12, and separated the mold elements from the finished cast lens by the method illustrated in FIG. 11. By this method I produced a hard lens casting, the optical power of which was substantially zero dioptric power.

In this last above illustration I chose to use mold elements with opposed optical curves of similar radius. I controlled the thickness by choosing a given depth for the lower dimension wall of the mold assembly support member which allowed depth enough in the cavity to receive the lower mold element and to accommodate its thickness while leaving a cavity of approximately 3 millimeters of axial separation between the apex of the opposed curves of the upper and lower mold elements.

In order to produce a lens of plus power I proceeded substantially as I did in the above example with the exception that I chose a lower mold element with a flatter curve of longer radius and of such thickness that when matched with given dimension of the dimension wall of the mold support assembly produced an edge thickness of the plus power lens of 2 millimeters. I did this by controlling the depth of the lower cavity and the height of the lower mold element from seat to apex of the convex curve.

In order to cast a lens containing a prismatic correction I first prepared a lower mold element with the desired optics ground on the convex surface. I then ground the seat on the outer area of the convex side of the lower mold element at an angle to the normal axis of the convex ground optical surface of the lower mold element as shown in FIG. 16. In order to obtain various lens thicknesses I varied the thickness of the lower mold element or adjusted the height, as shown in FIGS. 14 and 18, of the lower mold element 4 by means of spacer rings 35 to suit the desired lens characteristics. In order to obtain various prism powers I varied the wedge angle as shown in FIG. 15, at which I ground the seat of the lower mold element or used wedge shaped spacer rings as shown in FIGS. 15 and 19.

In a further illustration of the invention I produced a semi-finished lens blank by using only an upper mold element, leaving the lower surface of the lens to be formed against the resilient lower wall of mold assembly support member as shown in FIG. 13.

I assembled the mold assembly and processed it as described above to produce a lens casting having only one finished surface, as shown in FIG. 13, leaving one surface to be finished by grinding and polishing. In another application of my invention I used only an upper mold element and a mold assembly support member. I pressed the mold element firmly onto the upper shelf of the mold, I filled the cavity with monomer and sealed the filler tube. I relied upon the tension seal at the periphery of the mold element to create the hermetic seal during the heat curing cycle. I was able, in this way, to produce a satisfactory lens casting. The mold assembly did not leak during the heating cycle.

While a preferred form of the invention has been illustrated in the drawings and discussed above, it should be adequately clear that considerable modifications may be made thereto without departing from the principles of the invention. Therefore, the foregoing should be considered in an illustrative sense rather than a limiting sense, and accordingly the extent of this invention should be limited only by the spirit and scope of the claims appended hereto.

What is claimed is:

1. A mold assembly for casting synthetic resin lenses comprising a resilient mold assembly support member in the form of an irregular cylinder having at least a pair of mold element positioning shelves of different diameters for supporting said mold elements and adjacent resilient walls connected to said positioning shelves, at least one of said walls interconnecting a pair of shelves, a plurality of mold elements of different diameters, each mold element being positioned on one of said shelves, said mold elements being disposed in an axially spaced relationship and with the periphery of said mold elements being in sealing contact with the inner surface of the walls, of said cylinder, each of said walls having an inner diameter slightly less than the diameter of the associated mold element before insertion of the mold elements and a sealed cavity having a boundary formed by opposing surfaces of the mold elements and the wall of the mold assembly supporting member between said mold elements within which a synthetic resin may be cast by polymerization, the boundary of said cavity including the entire surface of one face of one of the mold elements said face extending to the outermost periphery of the mold element.

2. A mold assembly according to claim 1 wherein said mold elements are of different diameter forming an optical lens casting cavity therebetween for casting a lens the optical properties of which are determined by the inner opposed faces of the mold elements against which the lens is cast.

3. A mold assembly according to claim 1 wherein said resilient wall is of a material having the characteristic of high resistance to axial elongation and relatively light resistance to axial compression.

4. A mold assembly according to claim 1 further including a cradle of substantially rigid construction for receiving and supporting said mold assembly support member and a sealing ring on said cradle arranged for constrictive movement cooperatively affixed to strengthen the sealing tension of said resilient wall and maintain sealing contact of said resilient wall with the periphery of said mold element.

5. A mold assembly according to claim 1 further including a substantially rigid cradle for supporting the resilient walls of said mold assembly support member against expansive travel.

6. A mold assembly according to claim 1 further including spacer means positioned under at least one of said mold elements and adjacent a mold element support shelf for setting the distance of the apex of one mold element relative to the mold support shelf and another mold surface.

7. A mold assembly according to claim 6 wherein spacer means is wedge shaped in the thickness dimension.

8. A mold assembly according to claim 1 wherein one of said mold elements is of wedge construction in thickness dimension.

9. A mold assembly according to claim 1 further including filler means in one of said walls by which a synthetic resin may be added to the sealed cavity.

10. A mold assembly for casting synthetic resin lenses, mold element means having one or more optical finished surfaces corresponding to the optical configuration desired on the lens to be cast, a resilient mold assembly support member including a shelf for supporting said mold element means and a resilient wall lying in sealing contact under tension with the periphery of said mold element, a sealing member overlying the mold element means and in contact with the wall of the mold assembly support member, said sealing member being heat fusion sealed to the wall of said mold assembly support member to cause said mold assembly to be hermetically sealed thereby forming a sealed cavity including one or more surfaces of the mold element means and the mold assembly support member wherein a synthetic resin lens may be cast by polymerization.

11. A mold assembly for casting synthetic resin lenses comprising a pair of mold elements of different diameters, a resilient mold assembly support member in the form of an irregular cylinder including a plurality of stepped mold element positioning shelves of different diameters, for supporting the mold elements and a resilient wall interconnecting said shelves and in sealing contact under tension with the periphery of said mold elements, a sealed cavity having a boundary formed by one or more surfaces of the mold elements and the walls of the mold assembly support member wherein a synthetic resin lens may be cast by polymerization and one portion of said wall having an inner diameter less than that of one mold element and greater than that of the second mold element between which the cavity is formed, the entire surface of one face of one of the mold elements forming part of the boundary of said cavity, said face extending to the outermost periphery of the mold element.

12. A mold for forming lenses by the polymerization therein of moneric material, a mold support element of one piece construction in the form of an irregular cylinder made of resilient thermoplastic material and including a first and a second wall of different inner diameters, a shelf interconnecting said walls, a base integrally joined to the first wall for completely closing off said cylinder at one end and an opening in said mold support element at the other end, a substantially rigid mold element having an inwardly facing optical surface adapted to be positioned on said shelf with its periphery in sealing contact with the second wall and thereby forming a hermetically sealed cavity with the second wall of the mold support element, the base and the inner face of the rigid mold element wherein a lens may be formed by polymerization of a monomer therein.

* * * * *